United States Patent Office 3,026,274
Patented Mar. 20, 1962

3,026,274
PRODUCTION OF FOAMABLE VINYL AROMATIC RESIN COMPOSITIONS
William J. McMillan, Midland, Mich., and George L. Nicholls, Dubuque, Iowa, assignors to The Dow Chemical Company, Midland, Mich., a corporation of Delaware
No Drawing. Continuation of application Ser. No. 699,526, Nov. 29, 1957. This application May 8, 1961, Ser. No. 110,605
6 Claims. (Cl. 260—2.5)

This invention relates to the production of foamable vinyl aromatic resin compositions. It relates more particularly to a process for making latent-foaming polymeric compositions comprised essentially of a normally solid thermoplastic vinyl aromatic resin having a volatile organic compound uniformly dispersed throughout and pertains especially to a method of making such polymeric compositions having improved foaming characteristics.

A process for making latent-foaming polymeric compositions is described in U.S. application Serial No. 699,666, filed November 29, 1957, by Earl F. Engles, now abandoned. In brief the process consists in forming a homogeneously heat-plastified mass comprising essentially a uniform mixture of a normally solid thermoplastic vinyl aromatic resin, e.g. polystyrene, polyvinyltoluene, polydichlorostyrene or the like, and a volatile organic compound in which the polymer is substantially insoluble such as a saturated aliphatic hydrocarbon containing from 4 to 7 carbon atoms in the molecule or sym-dichlorotetrafluoroethane, under superatmospheric pressure and extruding the heat-plastified mass through an orifice suitably in the form of strands, ribbons or a thin sheet at a temperature between 90° and 130° C. into a zone of substantially atmospheric pressure and almost immediately contacting the extruded material with a cooling liquid heat-transfer medium such as water or brine and rapidly cooling the extruded material to a temperature below 50° C., preferably to a temperature between 5° and 30° C. whereby a normally solid polymeric composition having a density of from about 0.8 to 1.2 and consisting essentially of the solid thermoplastic vinyl aromatic resin having the volatile organic compound uniformly dispersed throughout, is obtained. Such polymeric compositions upon heating to the softening point of the polymer, or a somewhat higher temperature, and above the boiling point of the volatile organic compound contained therein as foaming agent, expand to form a cellular or porous mass.

In making cellular masses from latent-foaming polymeric compositions prepared by the procedure described in the aforementioned patent application it has been observed that the foaming characteristics of the compositions vary widely. More specifically, the foamed volume of the polymer may vary from as little as three up to thirty times the initial volume of the polymeric composition between compositions prepared from similar vinyl aromatic resins containing substantially the same proportion and kind of volatile organic compound as the foaming agent. In addition to the wide variation in the foam volume which has a substantial effect on the density of the foam that is obtained, it has also been observed that the size and the uniformity of the cells in the expanded polymer is subject to wide variation, in that a single piece of the foamed polymer is frequently found to consist of both fine and relatively large cells of non-uniform sizes. The cause of the observed variations in the foaming characteristics of the latent-foaming vinyl aromatic resin compositions and the non-uniformity in the sizes of the cells in the foamed masses prepared from compositions which contain substantially the same kind and proportions of ingredients is not known, but is thought to be caused in part by the inherent hot-stretching or orienting of the extruded material as it falls, or is drawn away from the face of the extrusion die and cooled. The cooling of the material to temperatures below the softening point of the polymer not only locks-in the volatile organic compound employed as the foaming agent, but also freezes the polymer in an oriented or strained condition. Upon heating of the latent foaming polymeric compositions it has been observed that the polymer first shrinks slightly, indicating relaxation of strains, then expands to a cellular mass. Regardless of the cause, it is evident that such variation in the foaming characteristics of the vinyl aromatic resin compositions renders them less suited for the intended use than is desired.

It has now been discovered that substantial uniformity in the foaming characteristics, both with regard to the volume of the foamed mass and in the formation of cellular bodies composed of uniform small cells of substantially the same size, can readily be obtained by subjecting the latent-foaming vinyl aromatic resin compositions, having the solid polymer in an oriented or strained condition, to a heat-treatment in contact with a liquid heat-transfer medium at temperatures below the softening point of the polymer whereby the oriented polymer is substantially relaxed without substantial swelling or expanding of the polymer and cooling of the relaxed polymer to its normally solid condition, after which it can be foamed or stored and subsequently foamed to form a cellular mass of low density and composed of uniform small cells.

The process can advantageously be employed for treating latent-foaming vinyl aromatic resin compositions prepared by procedure as described in the afore-mentioned patent application, i.e. wherein a normally solid thermoplastic vinyl aromatic resin such as polystyrene or the like and a volatile organic compound, e.g. pentane or dichlorotetrafluoroethane, which is a poor solvent for the polymer is malaxated under superatmospheric pressures and at elevated temperatures into a homogeneously heat-plastified mass, then is extruded into a zone of substantially atmospheric pressure and almost immediately cooled to a temperature below 50° C. In most instances the so-prepared latent-foaming vinyl aromatic compositions contain the polymer in an oriented or strained condition, and have been found to have their foaming characteristics substantially improved when subjected to a heat-treatment, which can include a partial foaming or pre-foaming of the composition, according to the invention.

The process can be employed to improve the foaming characteristics of latent-foaming polymeric compositions containing the polymer in oriented or strained condition, which compositions are comprised essentially of a thermoplastic vinyl aromatic resin having a volatile organic compound in which the polymer is substantially insoluble uniformly dispersed throughout.

The vinyl aromatic resin can be a normally solid thermoplastic polymer of one or more monovinyl aromatic hydrocarbons of the benzene series, i.e. having a single vinyl radical directly attached to a carbon atom of the benzene nucleus, or a nuclear halogenated derivative thereof. Examples of suitable monomers from which the vinyl aromatic resins can be prepared are styrene, vinyltoluene, vinylxylene, ethylvinylbenzene, isopropylstyrene, ar-chlorostyrene, ar-dichlorostyrene ar-chlorovinyltoluene, fluorostyrene, bromostyrene or tert.-butyl styrene. Copolymers of from 70 to 99 percent by weight of any one or more of such monovinyl aromatic compounds and from 30 to 1 percent of alpha-methyl styrene, alpha-ethyl styrene, para-methyl-alpha-methylstyrene or acrylonitrile can also be used.

The volatile organic compounds which can be employed as the foaming agent for the vinyl aromatic resin can be a saturated aliphatic hydrocarbon containing from 4 to 7 carbon atoms in the molecule or a perchlorofluorohydrocarbon, which volatile organic compound has a molecular weight of at least 58 and a boiling point not higher than 95° C. at atmospheric pressure. Examples of such volatile organic compounds are n-pentane, isopentane, neopentane, hexane, n-butane, isobutane, heptane, octane, dichlorodifluoromethane, trichlorofluoromethane, monochlorotrifluoromethane, sym-tetrachlorodifluoroethane, 1,2,2-trichloro,1,1,2-trifluoroethane, sym-dichlorotetrafluoroethane, 1-chloro-1,1,2,2,2-pentafluoroethane, 1-chloro-1,2,2,3,3,4,4-heptafluorocyclobutane, or 1,2-dichloro-1,2,3,3,4,4-hexafluorocyclobutane. Mixtures of any two or more of such volatile organic compounds can also be employed as the foaming agent. Such agent or mixture of agents are usually employed in amounts corresponding to from 0.05 to 0.3 gram molecular proportion of the volatile organic compound(s) per 100 grams of the thermoplastic vinyl aromatic resin starting material.

In practice of the invention the latent-foaming vinyl aromatic resin compositions having the normally solid thermoplastic polymer in an oriented or strained condition and containing the volatile organic compound uniformly dispersed throughout is contacted with a liquid bath of a heat-transfer medium, preferably water or brine, at temperatures between 50° and 75° C. for a time sufficient to cause substantial relaxation of the strains in the polymer and insufficient to produce appreciable expanding or foaming of the polymer. In general, a treating time of from 2 to 180 minutes in water at temperatures between 50° and 75° C. is satisfactory. The time of treating the latent-foaming polymeric composition will vary, depending in part upon the size or cross-sectional dimensions of the polymerized composition and in part upon the temperature of the heat-transfer medium. For small particles, e.g. beads, rods, strands, etc., of sizes having a cross-section or diameter between 1/32 and 1/16 inch a relative short time of heat-treating such as from 2 to 15 minutes in a water bath at temperatures between 50° and 75° C. is satisfactory, whereas large particles, beads or strands require a somewhat longer time within the limits herein stated to obtain the beneficial results of the invention. The latent-foaming polymeric compositions should not be heated at temperatures and for prolonged periods of time which cause substantial foaming of the polymer or appreciable loss of the volatile organic foaming agent from the polymer, although a partial foaming or pre-foaming of the latent-foaming compositions can advantageously be employed or carried out. Such pre-foamed beads or particles can advantageously be employed in the subsequent production of foamed articles wherein the pre-foamed beads are further processed and expanded in a mold and caused to flow together during the expanding to obtain a cellular article having a desired shape or are expanded in a closed container to fill or to substantially fill the container with a cellular mass of the polymer, e.g. refrigerator doors.

As previously stated the heat-transfer medium is preferably liquid water or brine, but other aqueous inert liquid media can be used as mixtures of water and glycerine, ethylene glycol, ethyl alcohol, methyl alcohol or isopropyl alcohol, which mixtures contain a major proportion by weight of water.

The process can be carried out batchwise or in continuous manner. For example, the latent-foaming polymeric composition in the form of small particles can be immersed in a water bath and heat-treated at temperatures between 50° C. and 75° C. for a time of from 2 to 180 minutes, then removed and cooled to a lower temperature and dried. In an alternate procedure, the latent-foaming polymeric composition can be prepared by extruding a uniform homogeneously heat-plastified mass of the thermoplastic vinyl aromatic resin and the volatile organic compound in the desired proportions and under superatmospheric pressure at a temperature between 90° and 130° C. through an extrusion orifice as one or a plurality of strands into a zone of substantially atmospheric pressure wherein it is allowed to fall away or is drawn away from the extrusion orifice and almost immediately cooled to a temperature below 50° C. The cooled material in the form of strands having the polymer in oriented or strained condition is then passed in continuous manner, as it is formed and cooled, into or through a liquid heat-transfer medium and is heated at temperatures between 50° and 75° C., whereby the oriented polymer is substantially relaxed, then is cooled to a lower temperature such as a temperature between 10° and 30° C. by contact with water or brine or other liquid heat-transfer medium before appreciable expansion of the polymer or substantial loss of the volatile foaming agent occurs. Thereafter, the heat-treated and cooled latent-foaming polymeric material is usually cut or ground to a granular form. The heat-treated latent-foaming polymeric compositions possess substantially uniform foaming characteristics and are useful for making foamed masses having a low density and composed of cells of uniform size.

The following examples illustrate ways in which the principle of the invention has been applied but are not to be construed as limiting its scope.

EXAMPLE 1

A latent-foaming polymeric composition consisting of solid polystyrene containing 5.9 percent by weight of isopentane uniformly dispersed throughout was prepared by supplying heat-plastified polystyrene having a viscosity characteristic of 25 centipoises as determined for a 10 weight percent solution of the polystyrene in toluene at 25° C., to a plastics extruder at a temperature of about 180° C. wherein it was mixed with 6 percent by weight of isopentane and malaxated under a superatmospheric pressure and cooled to a uniform homogeneously heat-plastified mass and extruded under a pressure of about 850 pounds per square inch gauge pressure at a temperature of about 112° C. through a 3/16-inch diameter drill hole into a zone of substantially atmospheric pressure and almost immediately passed downward into a body of water maintained at temperatures between 10° and 23° C. The cooled material was drawn away as a strand having a diameter of about 1/8-inch and was cut to a granular form in lengths of about 1/8-inch. The product contained 5.9 percent by weight of isopentane. The polymer was in strained or oriented conditions as determined by viewing the same under polarized light. Test portions of the polystyrene composition were immersed in water at a temperature hereinafter stated and heated at said temperature for a time as stated in the following table, then removed and cooled to room temperature. Thereafter, the so-treated polymeric composition was foamed by heating the same at temperatures between 105° and 110° C. with superheated steam at atmospheric pressure for a period of 3 minutes. The foamed product was examined for total volume compared to the initial volume of the treated beads and the size of the cells.

Table I identifies the experiments and gives the ratio of the foamed mass to the initial volume of the polymeric material and the size of the individual cells. For purpose of comparison a portion of the polymeric material which was not heat-treated was foamed in a similar manner and the results included in the table.

Table I

| Run No. | Heat Treatment | | Foamed Product | |
|---|---|---|---|---|
| | Water Temp., °C. | Time, Min. | Foam Volume/initial volume ratio | Size of Cells, Millimeters |
| 1 | | | 40 | 1.5 |
| 2 | 50 | 120 | 66.5 | 0.1 |
| 3 | 60 | 90 | 53.5 | 0.1 |
| 4 | 65 | 90 | 49.5 | 0.1 |

EXAMPLE 2

A latent-foaming polymeric composition consisting of polystyrene containing 5 percent by weight of neopentane and in the form of ⅛ x ⅛-inch pellets, prepared by procedure similar to that described in Example 1, was heat-treated by immersing the same in water at a temperature and for a time as stated in the following table, then removing the treated material and cooling the same to room temperature. Portions of the treated polymeric material were foamed employing procedure similar to that employed in Example 1. The results are reported in Table II.

Table II

| Run No. | Heat Treatment | | Foamed Product | |
|---|---|---|---|---|
| | Water Temp., °C. | Time, Min. | Foam Volume/initial volume ratio | Size of Cells, Millimeters |
| 1 | | | | 1.5 |
| 2 | 60 | 80 | 60.5 | 0.1 |
| 3 | 65 | 60 | 51 | 0.1-0.15 |
| 4 | 70 | 40 | 30 | 0.1 |
| 5 | 75 | 25 | 18 | 0.1 |

EXAMPLE 3

A granular latent-foaming polymeric composition consisting of polystyrene containing one percent by weight of white mineral oil as lubricant and 6.29 percent by weight of isopentane uniformly dispersed throughout as foaming agent was prepared by procedure similar to that described in Example 1. The polymeric compositions were in the form of pellets having a diameter of 1.38 millimeters by 2.8 millimeters long and were obtained by cutting the strands of the cooled material into segments as it was formed. In each of a series of experiments a portion of the granular polymeric composition was immersed in water at a temperature as stated in the following table for a period of 20 minutes, then removed and cooled to room temperature. The so-treated granules were measured to determine the average diameter and length of the same. Thereafter, a portion of the treated granules was foamed by heating at temperatures between 105° and 109° C. in superheated steam at atmospheric pressure for a period of three minutes. The foamed particles were examined to determine the ratio of the average volume of the foamed polymer to the initial volume of the heat-treated polymeric material and the size of the cells in the foamed polymer. Table III identifies the experiments and gives the temperature and time for which the heat-treatment was carried out. The table also gives the average diameter and length of the heat-treated polymeric product, the ratio of the volume of the foamed polymer to the initial volume of the polymeric material prior to foaming and the size of the cells in the foamed product.

Table III

| Run No. | Heat Treatment | | Particle Size | | Foamed Product | | |
|---|---|---|---|---|---|---|---|
| | Water Temp., °C. | Time, Min. | Dia., mm. | Length, mm. | Foamed Volume/initial volume Ratio | Size of cells, mm. | Density, lbs./cu. ft. |
| 1 | | | 1.38 | 2.80 | 39 | 2.84 | 1.6 |
| 2 | 50 | 20 | 1.14 | 2.07 | 43 | 0.24 | 1.45 |
| 3 | 60 | 20 | 1.33 | 1.71 | 43 | | 1.45 |
| 4 | 65 | 20 | 1.54 | 1.55 | 40 | 0.2 | 1.56 |
| 5 | 70 | 20 | 1.42 | 1.69 | 46 | 0.078 | 1.35 |
| 6 | 75 | 20 | 1.13 | 1.60 | 45 | 0.050 | 1.38 |

This application is a continuation of our pending application Serial No. 699,526, filed November 29, 1957, now abandoned.

We claim:

1. In a process for making a latent-foaming polymeric composition comprising a normally solid thermoplastic vinyl aromatic resin having a volatile organic compound having a molecular weight of at least 58 and a boiling point not higher than 95° C. at atmospheric pressure, in which the polymer is insoluble, uniformly distributed throughout, wherein a uniform homogeneously heat-plastified mass comprising the vinyl aromatic resin and the volatile organic compound under superatmospheric pressure is extruded into a zone of lower pressure and almost immediately contacted with a liquid cooling medium and cooled to a temperature below 50° C., whereby the cooled extruded material is a rigid non-foamed material and contains the solid polymer in oriented condition, the steps which consist in contacting the solid polymer containing the volatile organic compound dispersed throughout with an aqueous liquid heat transfer medium at temperatures between 50° C. and the softening point of the polymer for a period of time not greater than 180 minutes sufficient to anneal the oriented polymer and insufficient to cause appreciable swelling of the polymer by vapors of the volatile organic compound contained therein and without substantial lowering of its density, then cooling the so-treated polymeric material to a temperature below said treating temperature.

2. A process according to claim 2 wherein the vinyl aromatic resin is a styrene polymer.

3. In a process for making a latent-foaming polymeric composition comprising a normally solid thermoplastic vinyl aromatic resin having a volatile organic compound having a molecular weight of at least 58 and a boiling point not higher than 95° C. at atmospheric pressure, in which the polymer is insoluble, uniformly dispersed throughout, wherein a uniform homogeneously heat-plastified mass comprising the vinyl aromatic resin and the volatile organic compound under superatmospheric pressure is extruded into a zone of lower pressure and almost immediately contacted with a liquid cooling medium and cooled to a temperature below 50° C. whereby the cooled extruded material has a density between 0.8 and 1.8 and contains the solid polymer in oriented condition, the steps which consist in contacting the solid polymer containing the volatile organic compound dispersed throughout with an aqueous liquid heat transfer medium at temperatures between 50° and 75° C. for a period of time not greater than 180 minutes sufficient to anneal the oriented polymer and insufficient to cause appreciable swelling of the polymer by vapors of the volatile organic compound contained therein and without substantial lowering of its density, then cooling the so-treated polymeric material to a temperature below 40° C.

4. A process which comprises contacting a latent-foaming polymeric composition consisting essentially of a solid thermoplastic vinyl aromatic resin having a volatile organic compound having a molecular weight of at least 58 and a boiling point not higher than 95° C. at atmospheric pressure, in which the polymer is insoluble uniformly dispersed throughout, which polymeric composition has a density between 0.8 and 1.2 and contains the polymer in an oriented condition, with an aqueous liquid heat transfer medium at temperatures between 50° and 75° C. for a period of time not greater than 180 minutes sufficient to anneal the oriented polymer and insufficient to cause appreciable swelling of the polymer by vapors of the volatile organic compound contained therein and without substantial lowering of its density, then cooling the so-treated polymeric material to a temperature below 40° C.

5. A process as claimed in claim 2, wherein the vinyl aromatic resin is polystyrene and the volatile organic compound is a saturated aliphatic hydrocarbon containing from 4 to 7 carbon atoms in the molecule.

6. A process as claimed in claim 3, wherein the saturated aliphatic hydrocarbon is one containing 5 carbon atoms in the molecule.

References Cited in the file of this patent

UNITED STATES PATENTS 2,787,809   Stastny ---------------- Apr. 9, 1957